June 27, 1939.  P. WAGNER  2,163,925
FAUCET
Filed June 13, 1938
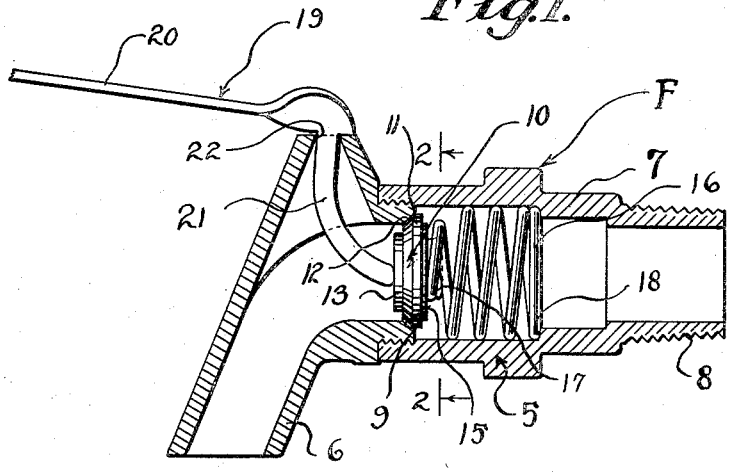
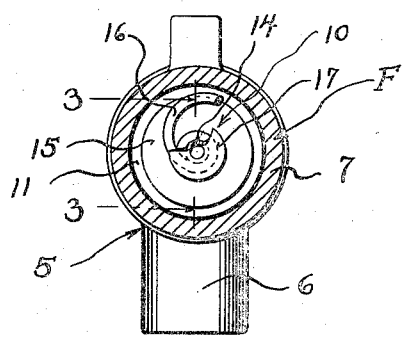
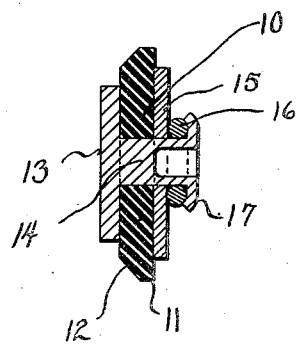
Inventor.
Paul Wagner
By
Attorneys Patented June 27, 1939

2,163,925

UNITED STATES PATENT OFFICE 2,163,925

FAUCET

Paul Wagner, Burlington, Wis.

Application June 13, 1938, Serial No. 213,406

1 Claim. (Cl. 251—144)

This invention appertains to valves, and more particularly to an automatic self-closing faucet, particularly adapted for dispensing liquids from barrels and other containers.

One of the primary objects of my invention is to provide a faucet having a novel valve with spring means normally holding the valve in its closed position against its seat, the valve and spring being of such a character, and associated together in such a manner, that the spring forms an efficient guide for said valve, whereby the necessity of providing auxiliary or additional valve-guiding means is dispensed with.

A further important object of my invention is to provide a faucet of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a central, longitudinal, sectional view through my improved faucet.

Figure 2 is a transverse, sectional view through the faucet, taken substantially on the line 2—2 of Figure 1, looking in the direction of the arrows, the operating handle in this view being shown removed.

Figure 3 is an enlarged detail sectional view through the valve body, the view being taken substantially on the line 3—3 of Figure 2, looking in the direction of the arrows.

Referring to the drawing in detail, wherein similar reference characters designate corresponding parts throughout the several views, the letter F generally indicates my improved faucet, which comprises a two-part casing 5. The front part 6 of the casing is detachably connected with the inner or rear part 7 of the casing, and the parts are preferably connected together by screw threads, as is clearly shown in Figure 1 of the drawing. The part 7 has formed thereon the rearwardly directed externally threaded nipple 8, whereby the faucet can be connected to a pipe or other outlet.

The front part 6 of the faucet has its inner end provided with a tapered valve seat 9, which is adapted to fit the valve 10. The valve 10 is shown in detail in Figure 3 of the drawing, and the same includes the valve disc 11 having its peripheral edge tapered or beveled, as at 12, for engaging the beveled seat 9. One face of the disc 11 is engaged by the wear-plate 13, and this wear-plate 13 carries the axially disposed hollow shank 14, which extends through the valve disc 11. The inner face of the valve disc 11 is engaged by a holding plate 15, and a hollow shank also extends through the holding plate. An expansion coil spring 16 is provided for normally holding the valve 10 on its seat, and this spring includes a plurality of convolutions of substantially equal diameter, the outer surfaces of which are adapted to engage the inner surface of the casing. The forward convolution of the spring gradually decreases in diameter, and is clinched about the hollow shank 14.

After the spring is engaged with the shank, the shank is upset as at 17. The upsetting of the shank holds the spring, the valve disc 11, the wear-plate 13, and the holding plate 15 all in their assembled, connected position. The rear end of the spring fits against an internal shoulder 18 formed on the casing 5, as is clearly shown in Figure 1 of the drawing.

Obviously, when the parts 6 and 7 of the casing 5 are connected, the valve 10 is firmly held on its seat by the spring 16. The convolutions of the spring, engaging the inner surface of the valve casing, function as a guide for the valve 10, and thus the necessity of providing additional means for guiding the valve during its opening and closing movement is entirely eliminated.

Not only does this cheapen the cost of the faucet, but the elimination of additional parts permits the free, unobstructed flow of liquid out of the faucet when the valve is unseated.

In order to provide means for operating the valve, I employ a removable actuating handle 19. This handle 19 includes a hand grip portion 20 and an arcuate shank 21, which is adapted to be extended through a guide opening 22 formed in the upper end of the part 6 of the valve casing. When the handle is inserted in the guide opening, the arcuate shank 21 engages the wear-plate 13. Hence, upon downward pressure on the hand grip 20, the valve will be forced off of its seat. Obviously, upon removal of the handle from the valve casing, operation of the valve will be prevented.

Changes in details may be made without departing from the spirit or the scope of my invention, but what I claim as new is:

In a faucet, a casing having an internal valve seat and an internal shoulder spaced from the valve seat, a valve body including a valve disc, a wear-plate engaging one side of the disc, a holding plate engaging the other side of the disc, a shank carried by the wear-plate extending through the valve disc and the holding plate, an expansion coil spring disposed in the valve body having its rearmost convolution detachably fitted on the shoulder, and its furthermost convolution clinched about the shank, the inner end of the shank being upset against said foremost convolution whereby to connect the wear-plate, the valve disc, the holding plate, and the spring together, and intermediate convolutions of said spring engaging the inner surface of the casing, as and for the purpose specified.

PAUL WAGNER.